(12) United States Patent
Chiba et al.

(10) Patent No.: US 10,696,330 B2
(45) Date of Patent: Jun. 30, 2020

(54) UPPER PART STRUCTURE OF VEHICLE BODY

(71) Applicants: TOYOTA JIDOSHA KABUSHIKI KAISHA, Toyota-shi, Aichi-ken (JP); TOYOTA JIDOSHA KYUSHU KABUSHIKI KAISHA, Miyawaka-shi, Fukuoka-ken (JP)

(72) Inventors: Kenji Chiba, Tokai (JP); Keisuke Yasuda, Nisshin (JP)

(73) Assignees: TOYOTA JIDOSHA KABUSHIKI KAISHA, Toyota (JP); TOYOTA JIDOSHA KYUSHU KABUSHIKI KAISHA, Miyawaka-shi (JP)

(*) Notice: Subject to any disclaimer, the term of this patent is extended or adjusted under 35 U.S.C. 154(b) by 0 days.

(21) Appl. No.: 16/255,113

(22) Filed: Jan. 23, 2019

(65) Prior Publication Data

US 2019/0225278 A1 Jul. 25, 2019

(30) Foreign Application Priority Data

Jan. 24, 2018 (JP) ................................. 2018-009387

(51) Int. Cl.
*B62D 25/06* (2006.01)
*B60J 7/043* (2006.01)

(52) U.S. Cl.
CPC .............. *B62D 25/06* (2013.01); *B60J 7/043* (2013.01)

(58) Field of Classification Search
CPC ................................. B62D 25/06; B60J 7/043
USPC .................. 296/203.03, 216.01, 216.07, 210
See application file for complete search history.

(56) References Cited

U.S. PATENT DOCUMENTS

2015/0367794 A1* 12/2015 Nishimura ............. B62D 25/04
296/187.13
2016/0244099 A1 8/2016 Oshima et al.

FOREIGN PATENT DOCUMENTS

| JP | 2006-298021 A | 11/2006 |
| JP | 2006-327284 A | 12/2006 |
| JP | 2006-327399 A | 12/2006 |
| JP | 2016-153291 A | 8/2016 |

* cited by examiner

*Primary Examiner* — Dennis H Pedder
(74) *Attorney, Agent, or Firm* — Oliff PLC (57) ABSTRACT

A roof panel is attached to a roof opening reinforcement that reinforces an area around an opening. The roof opening reinforcement has a rear side portion that extends in the lateral direction along the rear edge of the opening. The upper surface of the rear side portion of the roof opening reinforcement, or a roof panel opposed surface, extends along the lower surface of the roof panel. Extended reinforcements are disposed corresponding to the respective rear corners of the opening. The extended reinforcement extends toward the roof side rails as if forming an extension of the roof panel opposed surface, and is attached to the roof panel near where the roof panel is attached to the roof side rails.

5 Claims, 10 Drawing Sheets

UPPER PART STRUCTURE OF VEHICLE BODY

CROSS REFERENCE TO RELATED APPLICATION

This application claims priority to Japanese Patent Application No. 2018-009387 filed on Jan. 24, 2018, which is incorporated herein by reference in its entirety including the specification, claims, drawings, and abstract.

TECHNICAL FIELD

The present disclosure relates to the upper part structure of a vehicle body having a roof panel with an opening, such as a vehicle having a sunroof.

BACKGROUND

Vehicles having roofs, called sunroofs, for partial opening and closing have been known. Such a vehicle with a sunroof has a roof panel with an opening and a cover for opening and closing the opening.

Patent Literature 1 discloses the upper part structure (40) of a vehicle body of a vehicle (10) having a sunroof. The roof of the vehicle (10) includes a roof panel (14) having an opening (16) and a sliding glass (34) that slides to open and close the opening (16). In general, a roof panel is attached to roof side rails extending along the respective left and right side edges of the roof. Note that the reference numerals in the parentheses above are those given in Patent Literature 1 and are not related to those referred to in the following description of the embodiment of this disclosure.

CITATION LIST

Patent Literature

PATENT LITERATURE 1: JP2016-153291A

SUMMARY

Technical Problem

In the case of a roof panel having an opening, deformation of a vehicle leads to distortion of the roof panel concentrated around the periphery of the opening, which results in large deformation in the area. A rectangular opening, for example, is subjected to large deformation in particular near the corners of the opening. Deformation around the periphery of the opening causes cracks in and around an area where the roof panel is attached to the roof side rails. This may deteriorate reliable attachment.

The present disclosure aims to prevent occurrence of cracks at and around an attachment portion of a roof panel and roof side rails near the corners of a rectangular roof opening.

Solution to Problem

The upper part structure of a vehicle body according to the present disclosure includes a pair of roof side rails extending in the longitudinal direction of a vehicle in respective upper left and right lateral portions of the vehicle, and a roof panel disposed extending between, and attached to, the pair of roof side rails to constitute a roof of the vehicle. The roof panel has a rectangular roof opening, and is attached, on its lower surface, to an opening rear edge reinforcement extending along the rear edge of the roof opening. The opening rear edge reinforcement has a roof panel opposed surface extending along the lower surface of the roof panel. The upper part structure further includes a pair of extended reinforcements extending from the roof panel opposed surface of the opening rear edge reinforcement toward the respective left and right lateral end edges of the roof panel, as if forming an extension of the roof panel opposed surface. The pair of extended reinforcement are disposed corresponding to the respective left and right rear corners of the roof opening. The pair of extended reinforcement are attached to the roof panel near where the roof panel is attached to the roof side rails.

The provision of the extended reinforcements corresponding to the left and right rear corners of the roof opening enhances rigidity of the roof in the areas, and can thus prevent displacement of the roof panel.

The upper part structure of a vehicle body mentioned above may further include a lateral surface outer panel covering the outdoor-side surface of the roof side rail. The roof side rail may include an outer rail member disposed on the outdoor side and an inner rail member disposed on the indoor side, the outer rail member and the inner rail member together defining a closed cross sectional structure. The roof panel may be attached to the extended reinforcement at first positions in the longitudinal direction of the vehicle. The lateral surface outer panel, the outer rail member, and the inner rail member may be attached to one another at second positions in the longitudinal direction of the vehicle. The roof panel, the lateral surface outer panel, and the outer rail member may be attached to one another at third positions in the longitudinal direction of the vehicle, the third positions being different from the first positions and the second positions.

Separation of the attachment positions can prevent the stacking thickness of the members attached in one attachment from becoming thicker.

The first positions and the third positions may be alternately aligned. The second positions and the third positions may be alternately aligned. This can enhance reliability of attachment between members.

The first position may be defined at the same position as the second position in at least some attachments. This can reduce a space needed for attachment.

The extended reinforcement may be disposed stacked on the lateral surface outer panel, the outer rail member, and the inner rail member at the first position. The extended reinforcement may have a notch formed at the third position, the notch extending inward from the outer end edge of the extended reinforcement in the lateral direction while avoiding where the roof panel, the lateral surface outer panel, and the outer rail member are attached to one another.

The provision of the notch to the extended reinforcement enables alignment of the attached points in the longitudinal direction of the vehicle. This can reduce a space necessary for attachment in the lateral direction.

The opening rear edge reinforcement may be a part of a roof opening reinforcement formed along the peripheral edge of the roof opening and attached to the roof panel. This can reinforce the peripheral edge of the opening.

The extended reinforcement prevents displacement of a part near the corners of the roof opening of a roof panel, and can thus prevent occurrence of cracks at and around attachment portions of the roof panel and the roof side rails near the corners.

BRIEF DESCRIPTION OF DRAWINGS

Embodiment(s) of the present disclosure will be described based on the following figures, wherein.

DESCRIPTION OF EMBODIMENTS

Figure 1:
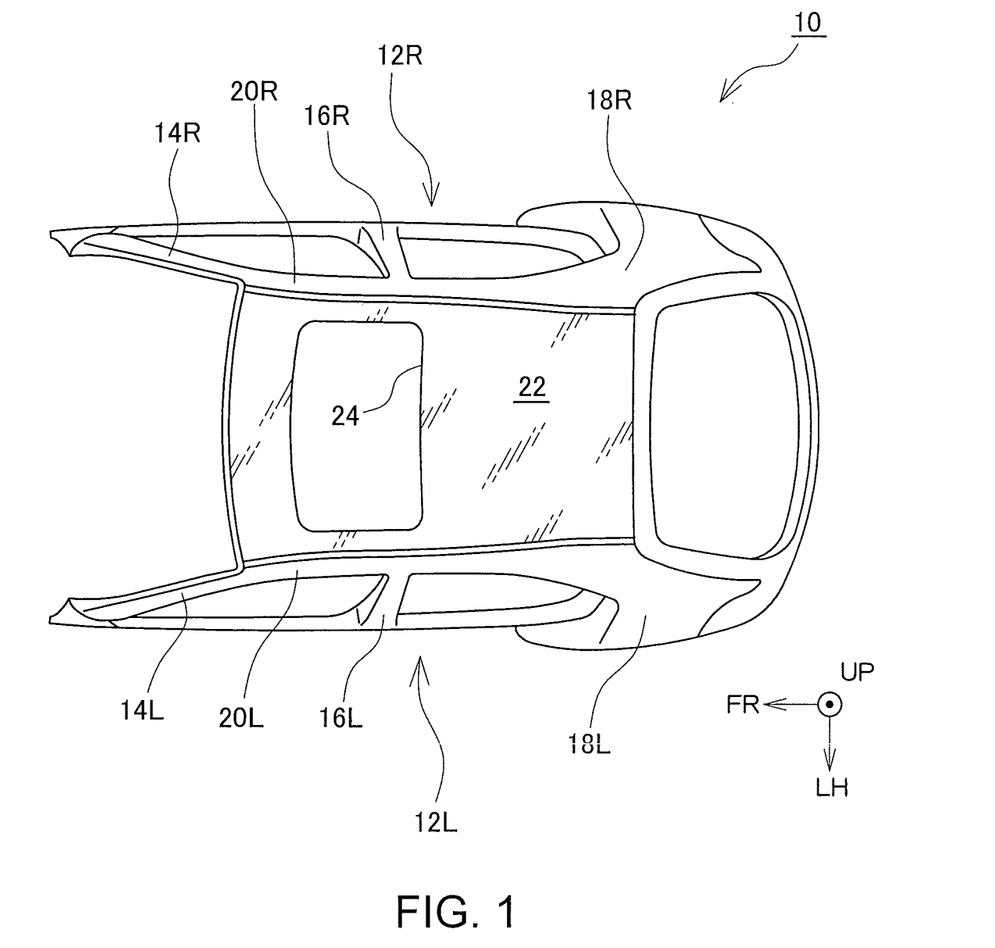
FIG. 1 is a plan view of an upper part structure of a vehicle body according to this embodiment.

An embodiment of the present disclosure will now be described with reference to the accompanying drawings. FIG. 1 is a plan view of the upper part structure 10 of a vehicle body. The arrow FR indicates the forward direction of a vehicle; the arrow LH the leftward direction; and the arrow UP the upward direction, or a direction approaching a viewer facing the drawing. The directions indicated by the arrows are similarly applied to the subsequent drawings. The directions, such as, front, rear, right, left, up, and down, mentioned in the following description relate to the vehicle unless otherwise stated. The front-rear direction is referred to as a longitudinal direction while the right-left direction is referred to as a lateral direction. A side closer to the center line of the vehicle in the lateral direction is referred to as an inner side in the vehicle width direction, and a side farther from the center line is referred to as an outer side in the vehicle width direction. For sides of a member or a structural component that defines a vehicle cabin, the side facing the vehicle cabin is referred to as an indoor side while a side opposite to the indoor side of the vehicle is referred to as an outdoor side.

The upper part structure 10 includes a left side member 12L and a right side member 12R respectively constituting the left and right lateral surfaces of the vehicle body. The left side member 12L and the right side member 12R will be hereinafter simply referred to as side members 12 with "L" and "R" omitted when distinction is unnecessary. Left and right members making a pair will also be referred to with "L" and "R" omitted when distinction is unnecessary. The left side member 12L includes a left roof side rail 20L supported by a left front pillar 14L, a left center pillar 16L, and a left rear pillar 18L extending in the longitudinal direction on the upper edge of the left side member 12L. Similarly, the right side member 12R includes a right roof side rail 20R supported by a right front pillar 14R, a right center pillar 16R, and a right rear pillar 18R, and extends in the longitudinal direction on the upper edge of the right side member 12R.

The upper part structure 10 further includes a roof panel 22 extending between the left and right roof side rails 20L, 20R. The roof panel 22 is attached to the roof side rails via the respective left and right lateral edges of the roof panel 22 through spot welding, for example. The roof panel 22 has a substantially rectangular roof opening 24 that is long in the lateral direction and formed in the front-half portion of the roof panel 22. The roof opening 24 is formed above the front seats such that the left and right lateral edges of the roof opening 24 extend in the longitudinal direction near the respective lateral edges of the roof panel 22. The roof opening 24 is an opening of a sunroof. A finished vehicle has a cover (not illustrated) removably attached to or to open and close the roof opening 24. A substantially rectangular roof opening reinforcement 26 (see FIGS. 2 and 4) is disposed on the lower surface of the roof panel 22, that is, the surface on the side in FIG. 1 farther from a viewer facing the drawing. The roof opening reinforcement 26 is disposed along the peripheral edge of the roof opening 24.

Figure 2:
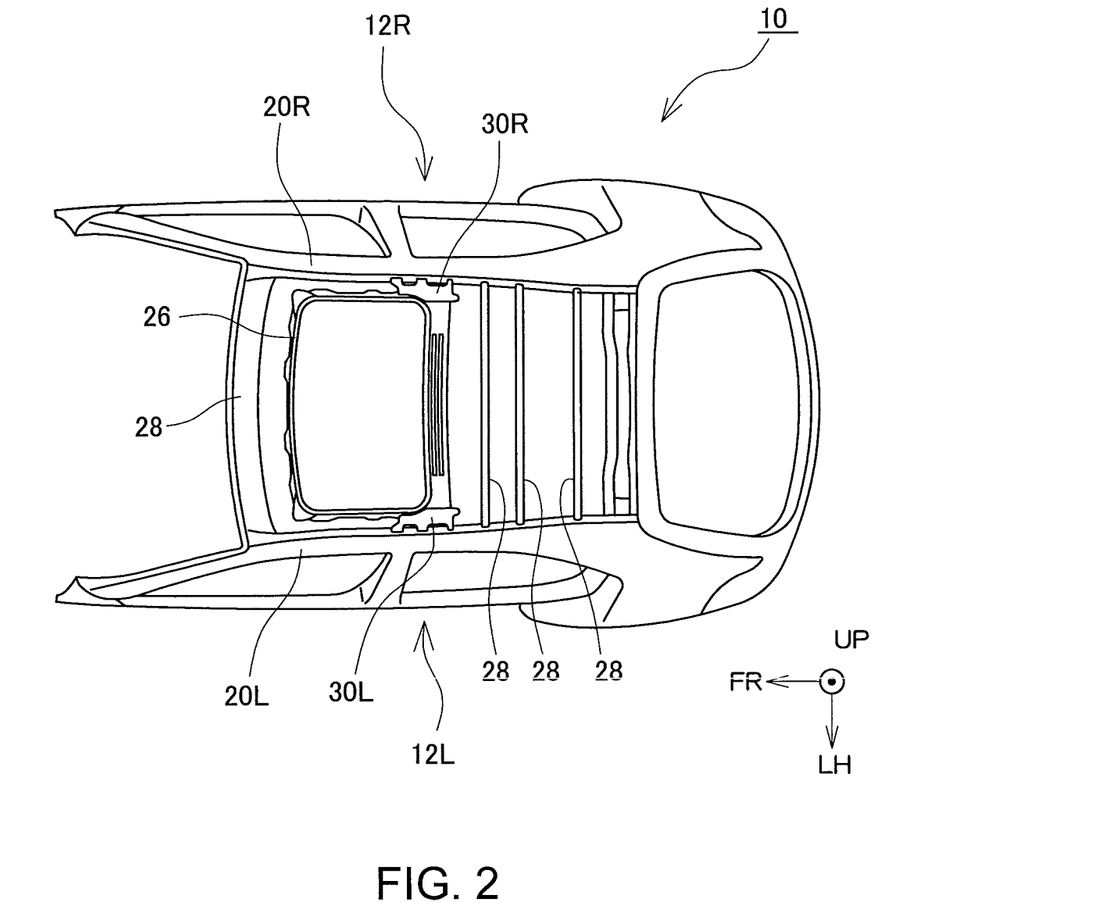
FIG. 2 is a plan view of an upper part structure of a vehicle body without a roof panel.

FIG. 2 illustrates the upper part structure 10 without the roof panel 22. A plurality of roof cross reinforcements 28 are disposed extending between the left and right roof side rails 20. The roof opening reinforcement 26 is disposed corresponding to the roof opening 24, as described above. The roof opening reinforcement 26 is a substantially rectangular frame, and has extended reinforcements 30L, 30R attached thereto on its respective left and right rear corners through spot welding, for example. The extended reinforcement 30 is not directly attached to the roof side rail 20.

Figure 3:
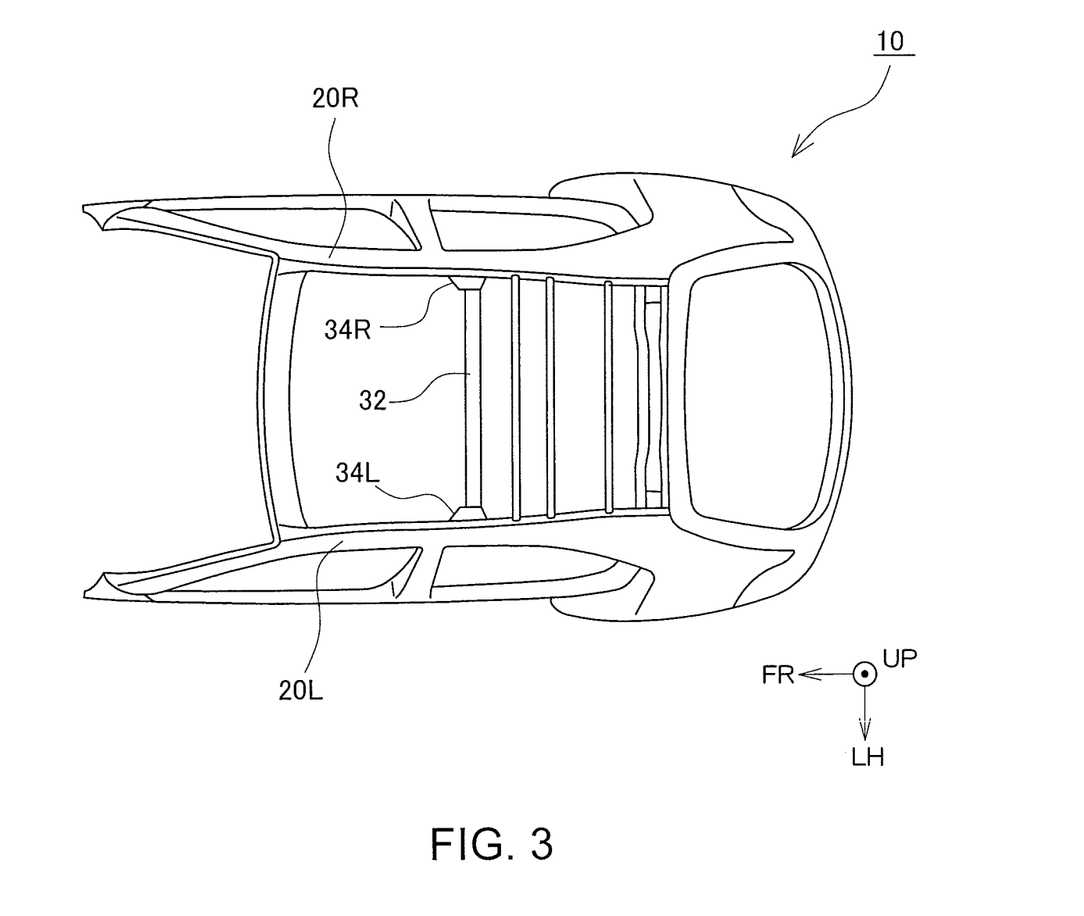
FIG. 3 is a plan view of an upper part structure of a vehicle body without a roof panel, a roof opening reinforcement, and an extended reinforcement.

FIG. 3 illustrates the upper part structure 10 illustrated in FIG. 2 without the roof opening reinforcement 26 and the extended reinforcement 30. A cross beam 32 is disposed below the rear side portion of the roof opening reinforcement 26 so as to extend in the lateral direction. The respective left and right ends of the cross beam 32 are attached to the respective left and right beam brackets 34L, 34R attached to the roof side rails 20.

Figure 4:
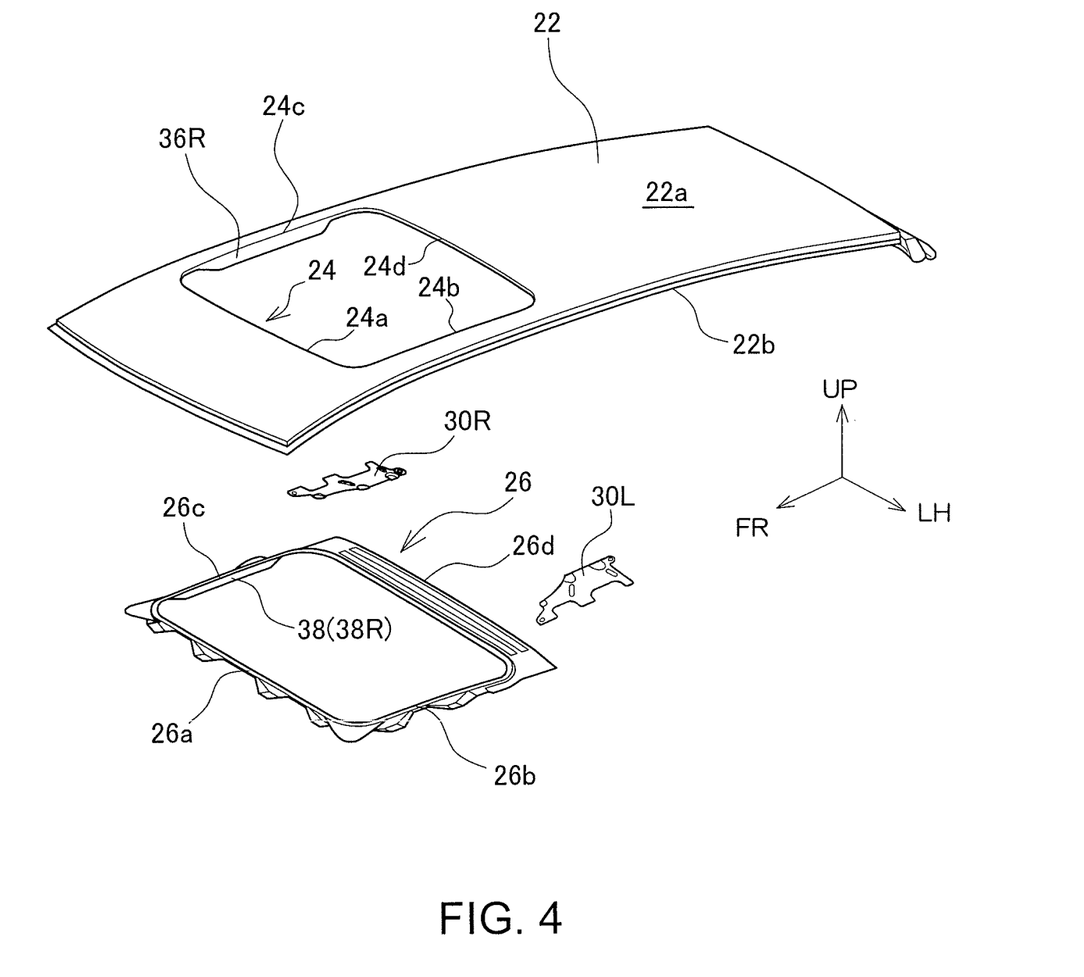
FIG. 4 is a perspective view of a roof panel, a roof opening reinforcement, and an extended reinforcement.
Figure 5:
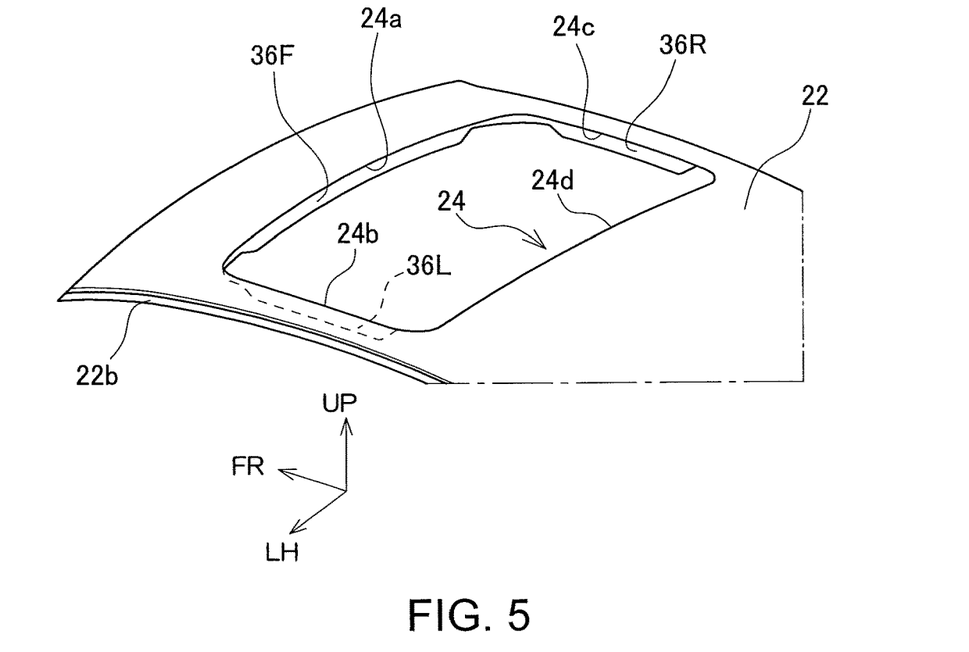
FIG. 5 is a perspective view of the structure of an area around the periphery of a roof opening.

FIG. 4 is an exploded perspective view of the roof panel 22, the roof opening reinforcement 26, and the extended reinforcements 30. FIG. 5 is a perspective view of the roof panel 22 around the roof opening 24 viewed from obliquely behind. The roof panel 22 is made by press-forming a steel plate into a predetermined shape. The main surface 22a of the roof panel 22 constitutes the outer surface of a finished vehicle. The roof panel 22 has a roof lateral edge flange 22b formed on each of its left and right lateral edges so as to be positioned lower than the main surface 22a. The roof panel 22 is attached to the roof side rails 20 through spot welding, for example, via the roof lateral edge flanges 22b. The roof panel 22 has a roof opening front edge flange 36F, a roof opening left lateral edge flange 36L, and a roof opening right lateral edge flange 36R formed along, and suspending from, the front edge 24a and the left and right lateral edges 24b, 24c, respectively, of the roof opening 24. These flanges 36F, 36L, 36R will be collectively referred to as roof opening edge flanges 36.

The roof opening reinforcement 26 is made by press-forming a steel plate into a predetermined shape. The roof opening reinforcement 26 serves to impart strength and rigidity, and is thus made using a thicker steel plate than that which is used to form the roof panel 22, for which ease of press working should be considered. The roof opening reinforcement 26 includes a front side portion 26a, a left side portion 26b, a right side portion 26c, and a rear side portion 26d, that respectively extend along the front edge 24a, the left edge 24b, the right edge 24c, and the rear edge 24d of the roof opening 24 when the roof opening reinforcement 26 is assembled in the roof panel 22. Roof opening reinforcement flanges 38 are formed along and respectively suspend from the front side portion 26a, the left side portion 26b, and the right side portion 26c. Only the right side flange 38R of the right side portion 26c is illustrated in FIG. 4.

Figure 6:
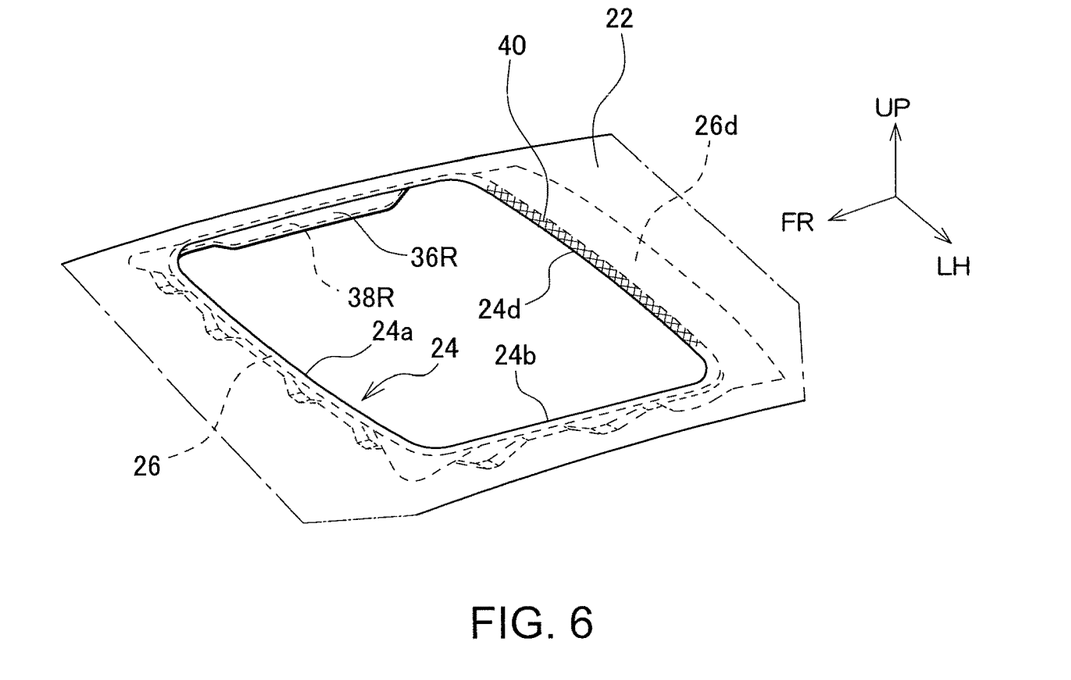
FIG. 6 is a perspective view of the structure of an area around the periphery of a roof opening with a roof opening reinforcement.

FIG. 6 illustrates the roof panel 22 with the roof opening reinforcement 26. The roof opening reinforcement flange 38 is positioned adjacent to and on the outer side of its corresponding roof opening edge flange 36. These flanges are attached to each other through spot welding, for example. The lower surface of the roof panel 22 is adhered to the upper surface of the rear side portion 26d of the roof opening reinforcement with adhesive agent along the rear edge 24d of the roof opening in an adhering area 40 indicated by the double diagonal lines in FIG. 6. The frame-shaped roof opening reinforcement 26 is attached on the area around the periphery of the roof opening 24 of the roof panel 22 to reinforce the area for enhanced rigidity of the area. The rear side portion 26d of the roof opening reinforcement extends in the lateral direction along the rear edge 24d of the roof opening 24 to function as an opening rear edge reinforcement attached to the roof panel 22.

Figure 7:
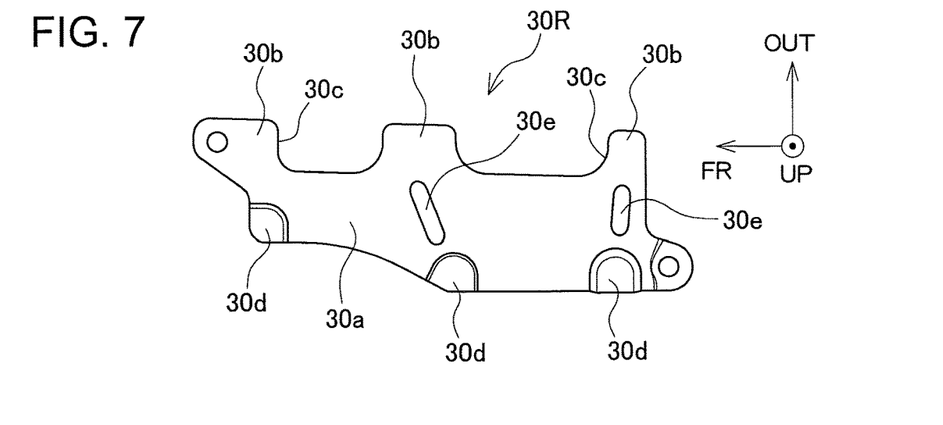
FIG. 7 is a plan view of an extended reinforcement.
Figure 8:
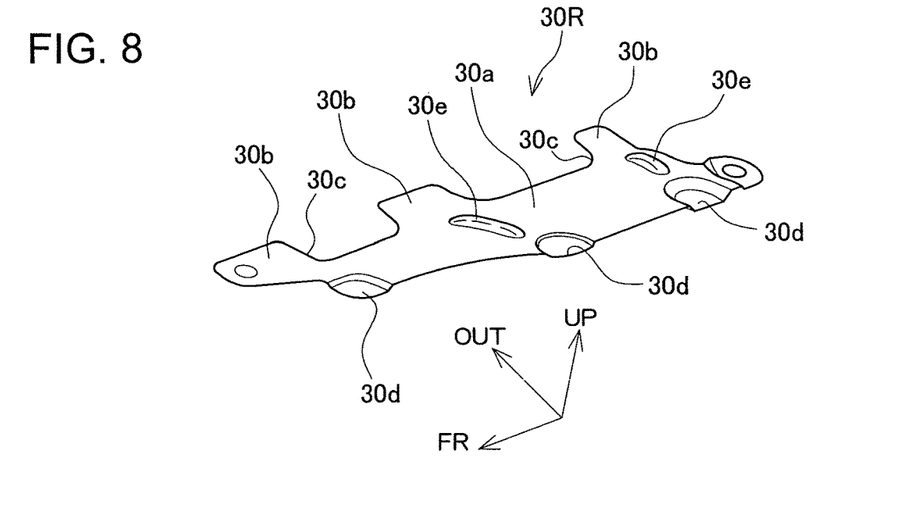
FIG. 8 is a perspective view of an extended reinforcement.
Figure 9:
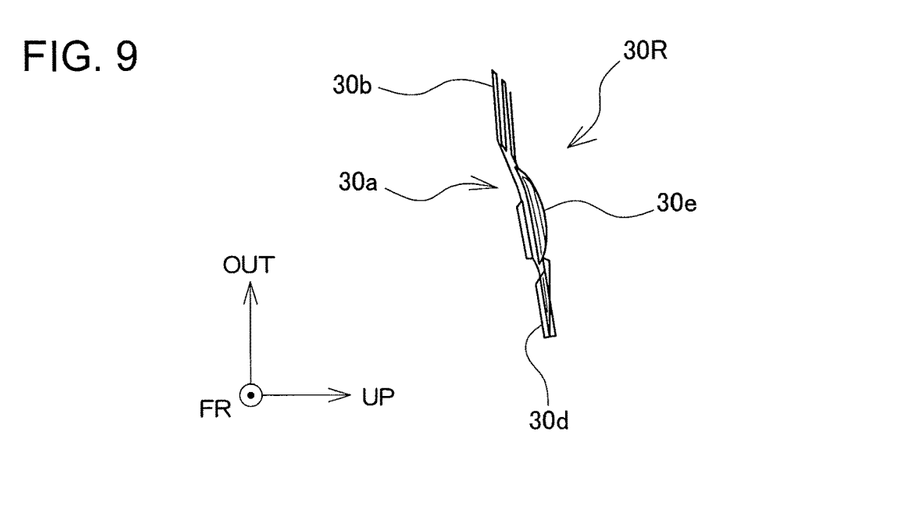
FIG. 9 illustrates an extended reinforcement viewed from the front.

FIGS. 7 to 9 illustrate the right-side extended reinforcement 30R. Specifically, FIG. 7 is a plan view of the right-side extended reinforcement 30R; FIG. 8 is a perspective view; and FIG. 9 illustrates the right-side extended reinforcement 30R viewed from the front. The left-side extended reinforcement 30L, which has a symmetrical structure to that of the illustrated right-side extended reinforcement 30R, is not described here. The arrow OUT in the drawing indicates the outward direction in the vehicle lateral direction, and similarly applies to the subsequent drawings. The extended reinforcement 30 is made by press-forming a steel plate into a predetermined shape. The extended reinforcement imparts strength and rigidity, and is thus made using a steel plate thicker than that which is used to form the roof panel 22 and as thick as that which is used to form the roof opening reinforcement 26. The extended reinforcement 30 includes a main portion 30a and three extended portions 30b extending outward from the main portion 30a in the vehicle lateral direction. Notches 30c are formed between these three extended portions 30b. The notch 30c is formed extending inward in the vehicle lateral direction from the outer end edge of the extended reinforcement 30 in the vehicle lateral direction, that is, an end edge defined by the tip end edge of the extended portion 30b. The extended portion 30b is attached to the roof lateral edge flange 22b of the roof panel 22 through spot welding, for example. The main portion 30a of the extended reinforcement has an attachment portion 30d formed on its inner side edge in the vehicle lateral direction. The attachment portion 30d is to be attached to the roof opening reinforcement 26 through spot welding, for example. The main portion 30a further has a ridge 30e protruding upward and extending in the substantially lateral direction. The ridge 30e enhances rigidity of the extended reinforcement 30 in the lateral direction.

If a vehicle body distorts, the distortion will cause large deformation in an area around, in particular, near the corners of, the roof opening 24 of the roof panel 22. For example, in the case where the front axle and the rear axle tilt in mutually opposite directions when viewed from the front of the vehicle due to an input from a road surface, the vehicle body will twist, causing large deformation around the left and right rear corners of the roof opening 24. In this embodiment, the extended reinforcement 30 is assembled in the upper part structure 10 to enhance rigidity in areas near the above-mentioned corners to thereby prevent deformation of the roof panel 22. This structure near the corners will now be described below in detail.

Figure 10:
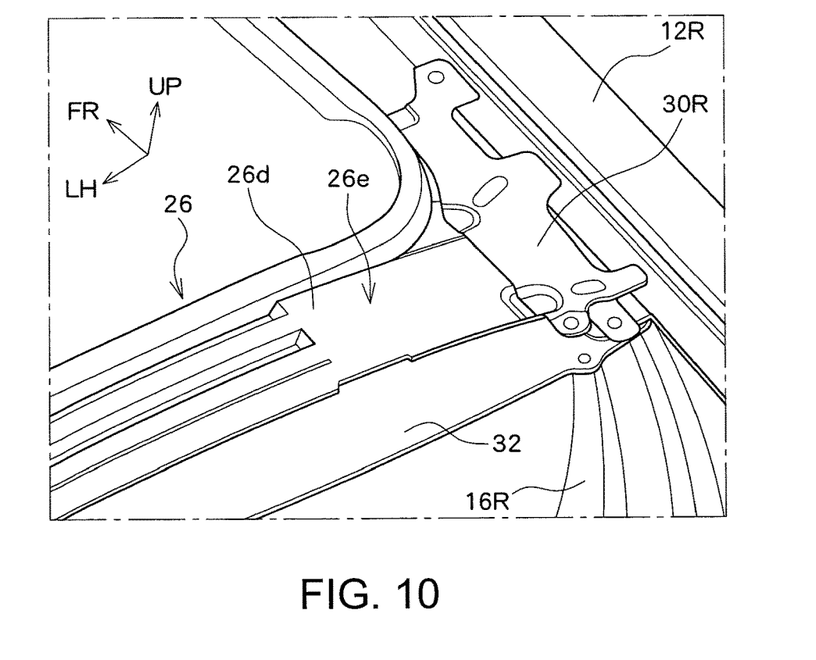
FIG. 10 illustrates the structure of an area near the right rear corner of the roof opening viewed from outside the vehicle cabin.
Figure 11:
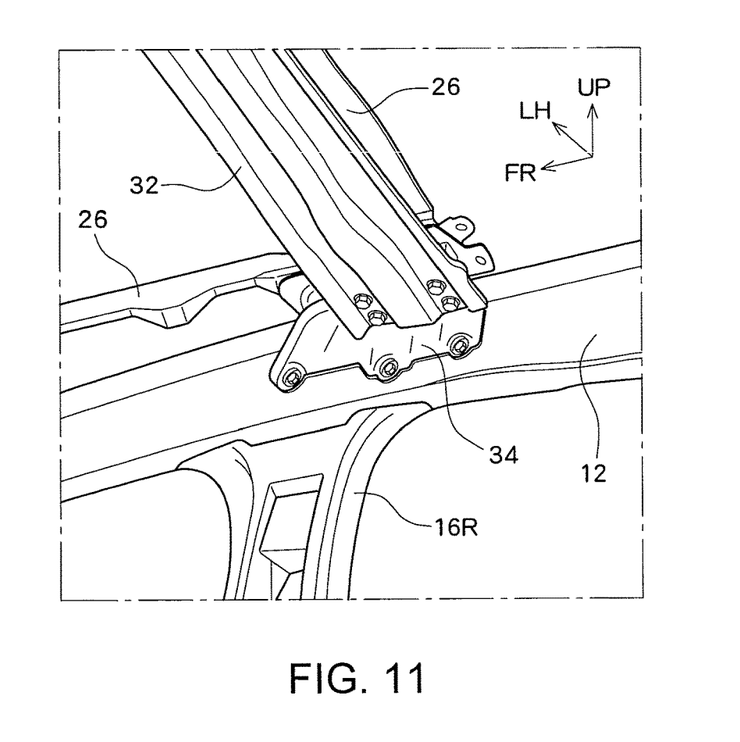
FIG. 11 illustrates the structure of an area near the right rear corner of the roof opening viewed from inside the vehicle cabin.
Figure 12:
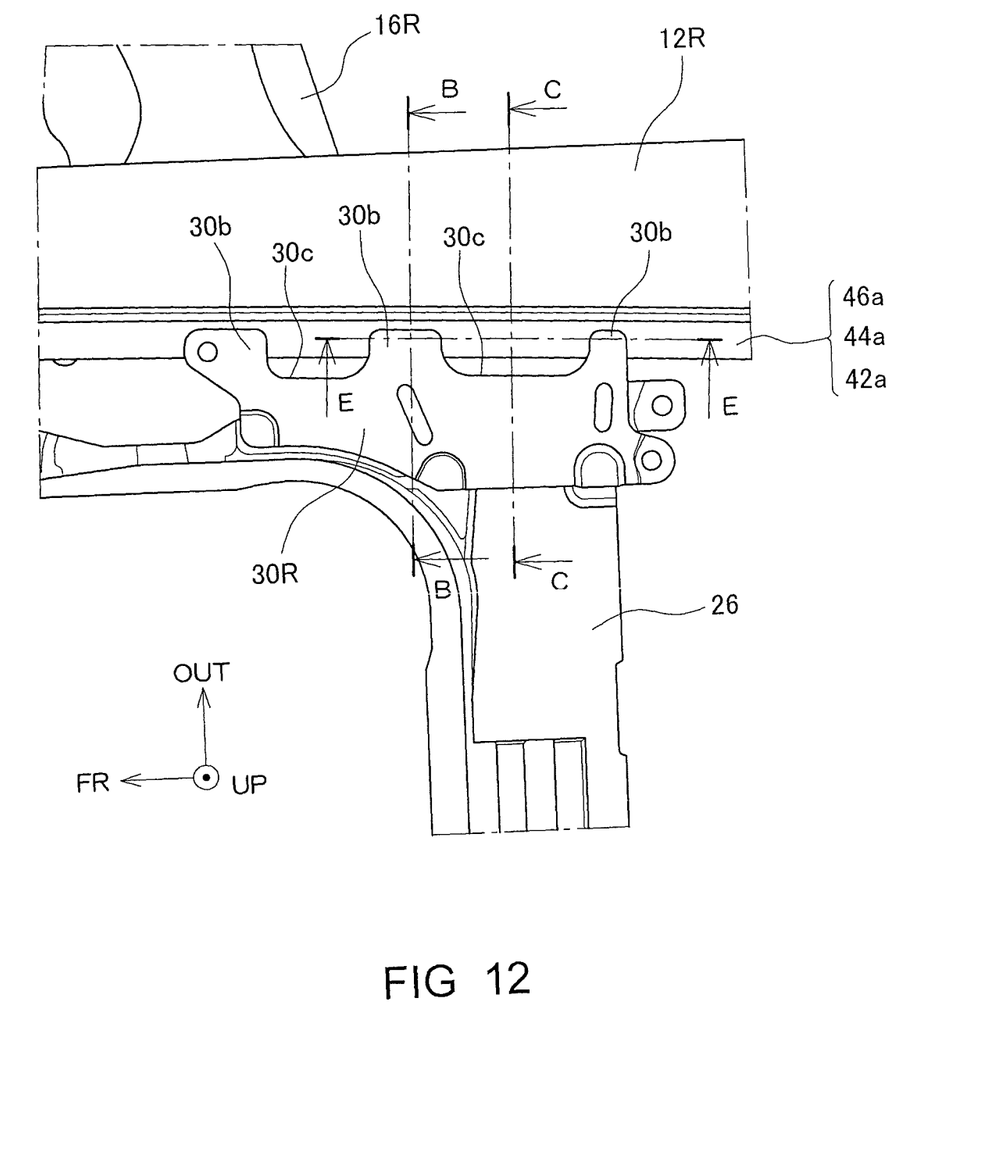
FIG. 12 is a plan view of the structure of an area near the right rear corner of the roof opening.
Figure 13:
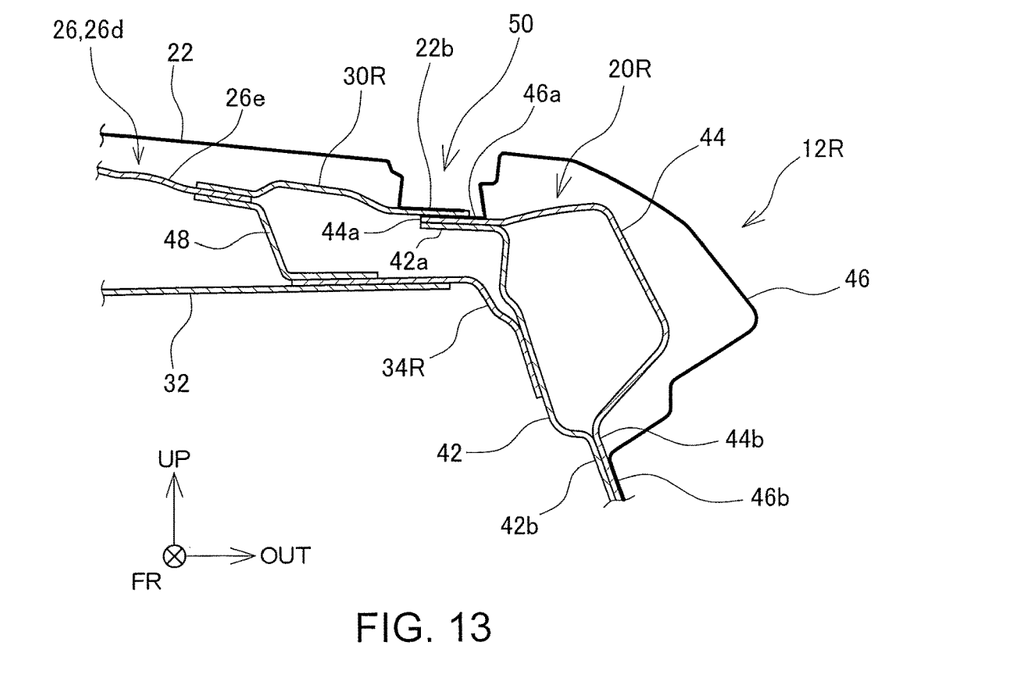
FIG. 13 is a cross sectional view along the line B-B in FIG. 12.
Figure 14:
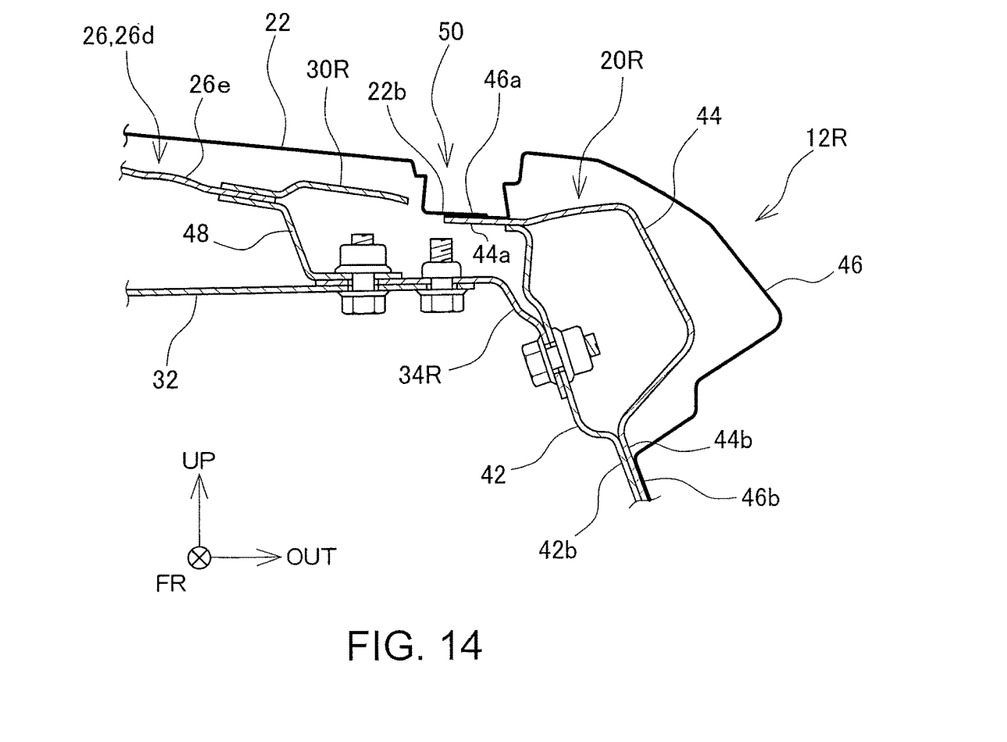
FIG. 14 is a cross sectional view along the line C-C in FIG. 12.

FIG. 10 is a perspective view of an area near the right rear corner of the roof opening 24 viewed from outside the vehicle cabin. FIG. 11 illustrates the same area viewed from inside the vehicle cabin. The roof panel 22 is not illustrated in FIGS. 10 and 11. FIG. 12 is a plan view of an area near the right rear corner of the roof opening 24. FIG. 13 is a cross sectional view along the line B-B in FIG. 12, or a cross section passing through the extended portion 30b of the extended reinforcement. FIG. 14 is a cross sectional view along the line C-C in FIG. 12, or a cross section passing through the notch 30c of the extended reinforcement. The structure near the left rear corner of the roof opening 24, which is symmetrical to that around the right rear corner illustrated in FIGS. 10 to 14, is not described here.

As illustrated in FIGS. 13 and 14, the roof side rail 20 includes an inner rail member 42 disposed on the indoor side and an outer rail member 44 disposed on the outdoor side. Each of the inner rail member 42 and the outer rail member 44 is made by press-forming a steel plate into a predetermined shape. The inner rail member 42 and the outer rail member 44 respectively have upper edge flanges 42a, 44a along the respective upper edges and lower edge flanges 42b, 44b along the respective lower edges. The upper edge flanges 42a, 44a are attached to each other through spot welding, for example, and the lower edge flanges 42b, 44b are attached to each other through spot welding, for example, whereby the closed cross section of the roof side rail 20 is defined. A lateral surface outer panel 46 is disposed on the outdoor side of the outer rail member 44, constituting the outermost surface of a finished vehicle. The lateral surface outer panel 46 is made by press-forming a steel plate into a predetermined shape. Specifically, a steel plate thinner than that which is used to form the inner rail member 42 and the outer rail member 44 is used to form the lateral surface outer panel 46 for ease of molding. The lateral surface outer panel 46 has an upper edge flange 46a along its upper edge, and the upper edge flange 46a is attached to the upper edge flanges 42a, 44a of the respective inner and outer rail members through spot welding, for example. The lateral surface outer panel 46 has a lower edge flange 46b along its lower edge, and the lower edge flange 46b is attached to the lower edge flanges 42b, 44b of the respective inner and outer rail members through spot welding, for example.

A beam bracket 34 is attached with attachment pieces, such as a bolt and a nut, at a position on the indoor side near a position where the inner rail member 42 is attached to the center pillar 16. The beam bracket 34 can be made by press-forming a steel plate into a predetermined shape. The beam bracket 34 is also attached to the cross beam 32 with attachment pieces, such as a bolt and a nut. The cross beam 32 can be made by press-forming a steel plate into a predetermined shape. The beam bracket 34 and the cross beam 32, which impart strength, are made using a steel plate thicker than that which is used to make the outer surface of the vehicle body, such as the lateral surface outer panel 46.

The roof opening reinforcement 26 is attached to a roof bracket 48 through spot welding, for example. The roof bracket 48 is attached to the beam bracket 34 with attachment pieces, such as a bolt and a nut. Specifically, the bolt and nut that are used to attach the cross beam 32 to the beam bracket 34 can be used to attach the roof bracket 48. The roof bracket 48, which imparts strength, is made using a steel plate thicker than that which is used to form the roof panel 22 and substantially as thick as that which is used to form the roof opening reinforcement 26. The roof bracket 48 is omissible if required strength can be achieved without the roof bracket 48.

The respective flanges 22b, 46a, 44a, 42a of the roof panel 22, the lateral surface outer panel 46, the outer rail member 44, the inner rail member 42, and the extended portion 30b of the extended reinforcement are disposed stacked on one another, thereby constituting the bottom portion of the groove 50 extending in the longitudinal direction along the right/left lateral edge of the roof. A mold (not illustrated) is buried in and along the groove 50 of a finished vehicle such that the upper surface of the mold connects the outer surfaces of the roof panel 22 and of the lateral surface outer panel 46 substantially without a step.

The upper surface 26e of the rear side portion 26d of the roof opening reinforcement 26 extends in the lateral direction along, while being spaced apart from, the lower surface of the roof panel 22. The upper surface 26e will be hereinafter referred to as a roof panel opposed surface 26e. The extended reinforcement 30 extends outward in the vehicle lateral direction beyond the lateral edge of the roof opening reinforcement 26 as if forming an extension of the roof panel opposed surface 26e. In particular, the extended portion 30b of the extended reinforcement extends to the roof lateral edge flange 22b and is attached to the roof lateral edge flange 22b through spot welding, for example. As clearly illustrated in FIG. 12, the extended reinforcement 30 does not extend to the upper edge flange 44a, for example, of the outer rail member at the positions corresponding to the notches 30c.

Figure 15:
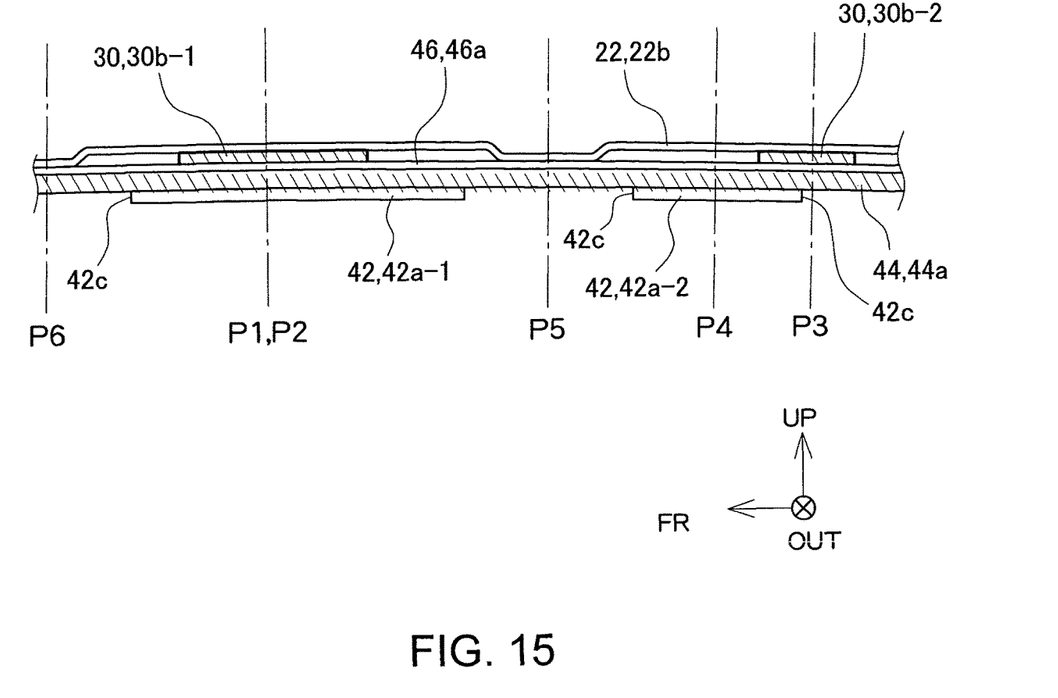
FIG. 15 is a cross sectional view along the line E-E in FIG. 12.

FIG. 15 is a cross sectional view along the line E-E in FIG. 12, with respective thicknesses illustrated exaggeratedly. The three extended portions 30b of the extended reinforcement 30 are aligned separate from one another, and are thus illustrated discretely in FIG. 15. For distinction, of the two extended portion 30b illustrated, the one positioned ahead is identified as 30b-1, while the one behind as 30b-2. The upper edge flange 42a of the inner rail member has notches 42c, and is thus illustrated as separate pieces in FIG. 15, similarly to the extended reinforcement 30. The one piece of the upper edge flange 42a positioned ahead is identified as 42a-1, while the one behind is identified as 42a-2.

The extended portion 30b-1 of the extended reinforcement, the upper edge flange 42a-1 of the inner rail member, the roof lateral edge flange 22b of the roof panel, the upper edge flange 46a of the lateral surface outer panel, and the upper edge flange 44a of the outer rail member are disposed stacked on one another at the positions P1, P2 illustrated. The extended portion 30b-2 of the extended reinforcement is disposed stacked on the roof lateral edge flange 22b of the roof panel, the upper edge flange 46a of the lateral surface outer panel, and the upper edge flange 44a of the outer rail member at the position P3 illustrated. The upper edge flange 42a-2 of the inner rail member is disposed stacked on the roof lateral edge flange 22b of the roof panel, the upper edge flange 46a of the lateral surface outer panel, and the upper edge flange 44a of the outer rail member at the position P4 illustrated. At the position P5, where the notch 30c (see FIGS. 8, 12) of the extended reinforcement is aligned with the notch 42c of the inner rail member, only the roof lateral edge flange 22b of the roof panel, the upper edge flange 46a of the lateral surface outer panel, and the upper edge flange 44a of the outer rail member are disposed stacked on one another.

The roof panel 22 is attached to the extended reinforcement 30 through spot welding, for example, at the positions P1 and P3. The positions P1 and P3 are first positions where the roof panel 22 is attached to the extended reinforcement 30. The lateral surface outer panel 46, the outer rail member 44, and the inner rail member 42 are attached to one another through spot welding, for example, at the positions P2 and P4. The positions P2 and P4 are second positions where the lateral surface outer panel 46, the outer rail member 44, and the inner rail member 42 are attached to one another. The roof panel 22, the lateral surface outer panel 46, and the outer rail member 44 are attached to one another at a position P5 and a position P6 through spot welding, for example. The positions P5 and P6 are third positions where the roof panel 22, the lateral surface outer panel 46, and the outer rail member 44 are attached to one another. Although the positions P1 and P2 are defined at the same position, the attachment of the roof panel 22 and the extended reinforcement 30 is independent of the attachment of the lateral surface outer panel 46, the outer rail member 44, and the inner rail member 42. At the position P3, the lateral surface outer panel 46 is not attached to the outer rail member 44, and the lateral surface outer panel 46 and the outer rail member 44 are not attached to the roof panel 22 and the extended reinforcement 30, either. At the position P4, the roof panel 22 is not attached to the lateral surface outer panel 46, the outer rail member 44, and the inner rail member 42.

The extended reinforcement 30 is attached to the roof panel via the three extended portions 30b, but not directly attached to the lateral surface outer panel 46, the outer rail member 44, and the inner rail member 42. Further, the roof panel 22, the lateral surface outer panel 46, and the outer rail member 44 are attached to one another at respective positions corresponding to two notches 30c of the extended reinforcement 30.

According to the attachment in the above described manner, three out of five steel plates at most are attached to one another per one attachment. This can prevent the stacking thickness of an attachment portion from being thicker, which facilitates attachment. For example, a conventional spot-welder can be used for the attachment in this manner. Further, the relatively thick steel plates of the extended reinforcement 30, the outer rail member 44, and the inner rail member 42 are not attached all together at the same time. This also contributes to reduction in the stacking thickness of an attachment portion.

The first positions (P1, P3) and the third positions (P6, P5) are alternately aligned. The second positions (P2, P4) and the third positions (P6, P5) are alternately aligned. Assuming that a first position (either P1 or P3) and a second position (either P2 or P4) that are located close to each other make a set, the position P1 and the position P2 make a first set, and the position P3 and the position P4 make a second set. These attached positions and the attached position sets are aligned in FIG. 15 in the order of the position P6, the first position set (the positions P1 and P2), the position P5, and the second position set (the positions P3 and P4). This manner of alignment can prevent the interval between the attached points of the roof panel 22 and the side member 12 and the interval between the attached points of the roof panel 22 and the extended reinforcement 30 from becoming longer.

The first position (either P1 or P3) and the second position (either P2 or P4) that make a set can be defined at the same position in at least one set. In this embodiment, the positions P1 and P2, making the first set, are defined at the same position, and the positions P3 and P4, making the second set, are not. Alternatively, the first position and the second position in every set can be defined at the same position. Defining the first and second positions at the same position can make a shorter interval between attached points.

The formation of the notches 30c, 42c on the end edges of the extended reinforcement 30 and the inner rail member 42, respectively, allows alignment of the attached points at the same position in the longitudinal direction. This allows the attached points to be accommodated in the groove 50.

The upper part structure 10 reinforces a peripheral area of the rear corners of the roof opening of the roof panel 22 with the extended reinforcement 30. The reinforcement can prevent deformation of the area due to deformation of the vehicle body. This can prevent occurrence of cracks at and around the attached point.

Although a vehicle having a roof panel with an opening to be opened and closed with a cover has been described in the above, this is not an exclusive example, and the present disclosure can be applied to a vehicle having a roof where any different member, such as glass, is fixedly assembled in the opening on the roof panel.

The invention claimed is:

1. An upper part structure of a vehicle body, comprising:
   a pair of roof side rails extending in a longitudinal direction of a vehicle in respective upper left and right lateral portions of the vehicle;
   a roof panel disposed extending between, and attached to, the pair of roof side rails to constitute a roof of the vehicle, the roof panel having a rectangular roof opening;
   an opening rear edge reinforcement extending in a lateral direction along a rear edge of the roof opening and attached to the roof panel, the opening rear edge reinforcement having a roof panel opposed surface extending along a lower surface of the roof panel;
   a pair of extended reinforcements disposed corresponding to respective left and right rear corners of the roof opening so as to extend from the roof panel opposed surface of the opening rear edge reinforcement toward respective left and right lateral end edges of the roof panel as if forming an extension of the roof panel opposed surface, the pair of extended reinforcements being attached to the roof panel near where the roof panel is attached to the roof side rails; and
   a lateral surface outer panel covering an outdoor-side surface of a corresponding roof side rail of the roof side rails, wherein:
   the roof side rail includes an outer rail member disposed on an outdoor side and an inner rail member disposed on an indoor side, the outer rail member and the inner rail member together defining a closed cross sectional structure,
   the roof panel is attached to an extended reinforcement of the pair of extended reinforcements at first positions in the longitudinal direction of the vehicle, the extended reinforcement being disposed stacked on the lateral surface outer panel, the outer rail member, and the inner rail member at the first positions,
   the lateral surface outer panel, the outer rail member, and the inner rail member are attached to one another at second positions in the longitudinal direction of the vehicle,
   the roof panel, the lateral surface outer panel, and the outer rail member are attached to one another at third positions in the longitudinal direction of the vehicle, the third positions being different from the first positions and the second positions, and
   the extended reinforcement has a notch formed at each of the third positions, each notch extending inward from an outer end edge of the extended reinforcement in a lateral direction and being configured such that, in plan view, the extended reinforcement does not overlap a location where the roof panel, the lateral surface outer panel, and the outer rail member are attached to one another.

2. The upper part structure of a vehicle body according to claim 1, wherein
   the first positions and the third positions are alternately aligned, and
   the second positions and the third positions are alternately aligned.

3. The upper part structure of a vehicle body according to claim 1, wherein
   a plurality of sets are each constituted by one of the first positions and one of the second positions located closest thereto, and in at least one of the plurality of sets, the first position and the second position are at a same position in the longitudinal direction of the vehicle.

4. The upper part structure of a vehicle body according to claim 2, wherein
   a plurality of sets are each constituted by one of the first positions and one of the second positions located closest thereto, and in at least one of the plurality of sets, the first position and the second position are at a same position in the longitudinal direction of the vehicle.

5. The upper part structure of a vehicle body according to claim 1, wherein the opening rear edge reinforcement is a part of a roof opening reinforcement formed along a peripheral edge of the roof opening and attached to the roof panel.

* * * * *